United States Patent [19]

Shima et al.

[11] 4,276,782
[45] Jul. 7, 1981

[54] TORSIONAL VIBRATION MONITORING APPARATUS FOR ROTATING SHAFT SYSTEM

[76] Inventors: Ichiji Shima; Tatsuo Yamamoto; Shigeru Yoshibayashi; Hiroshi Teshima, all c/o The Kansai Electric Power Co., Inc., Technical Research Centers of 2, Ichinotsubo 1-chome, Wakaoji, Amagasaki City, Osaka; Akio Hizume, 8-11, Naka-machi 1-chome, Setagaya-ku, Tokyo; Tetsuo Iki, 1998-5, Yakoo-machi, Nagasaki City, Nagasaki Pref.; Takashi Yamamoto, 347, Motomurago, Tokitsu-cho, Nishisonogi-gun, Nagasaki Pref.; Kyozo Kanamori, 16-10, Shiraiwa-cho, Isahaya City, Nagasaki Pref.; Kenzo Noguchi, 5-24, Nameshi 6-chome, Nagasaki City, Nagasaki Pref.; Shinobu Kishikawa, 22-1, Hanaoka-machi, Nagasaki City, Nagasaki Pref., all of Japan

[21] Appl. No.: 46,912

[22] Filed: Jun. 8, 1979

[30] Foreign Application Priority Data

Jun. 9, 1978 [JP] Japan .................................. 53/69498

[51] Int. Cl.³ .............................................. G01N 29/04
[52] U.S. Cl. ...................................................... 73/650
[58] Field of Search ............................................ 73/650

[56] References Cited

U.S. PATENT DOCUMENTS 4,051,427 9/1977 Kilgore et al. ......................... 73/650

*Primary Examiner*—Anthony V. Ciarlante
*Attorney, Agent, or Firm*—Toren, McGeady and Stanger

[57] ABSTRACT

The disclosed torsional vibration monitoring apparatus estimates torsional vibration at arbitrary positions in a shaft system, such as in a turbine generator. Detectors detect torsional vibrations produced at fixed positions of the rotating shaft system and the detected vibrations are separated into modal vibrations so that subtractors and matrix operators can obtain up to n vibration mode components from the modal vibrations and the torsional vibrations detected. First modal vibration operators obtain modal vibrations higher than the (n+1)th modal vibrations at the arbitrary positions of the rotating shaft system from the detected torsional vibrations, second modal operators obtain up to the n-th modal vibrations at the arbitrary positions from the vibration mode components and adders add the respective modal vibrations obtained by the first and second modal operators.

2 Claims, 10 Drawing Figures

FIG. 2
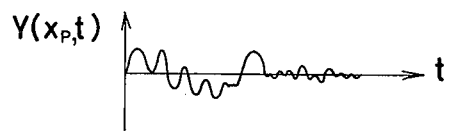
FIG. 2A
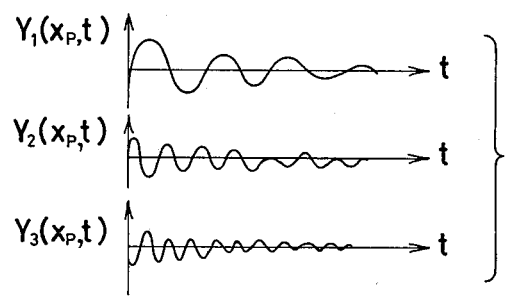
FIG. 2B
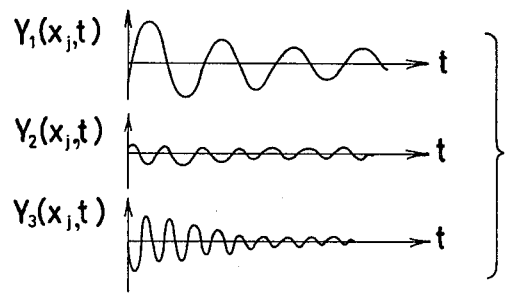
FIG. 2C
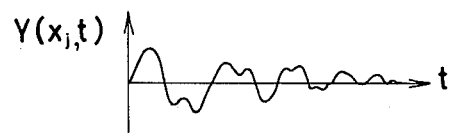
FIG. 2D
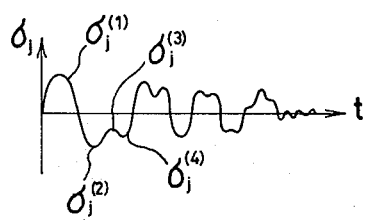
FIG. 2E

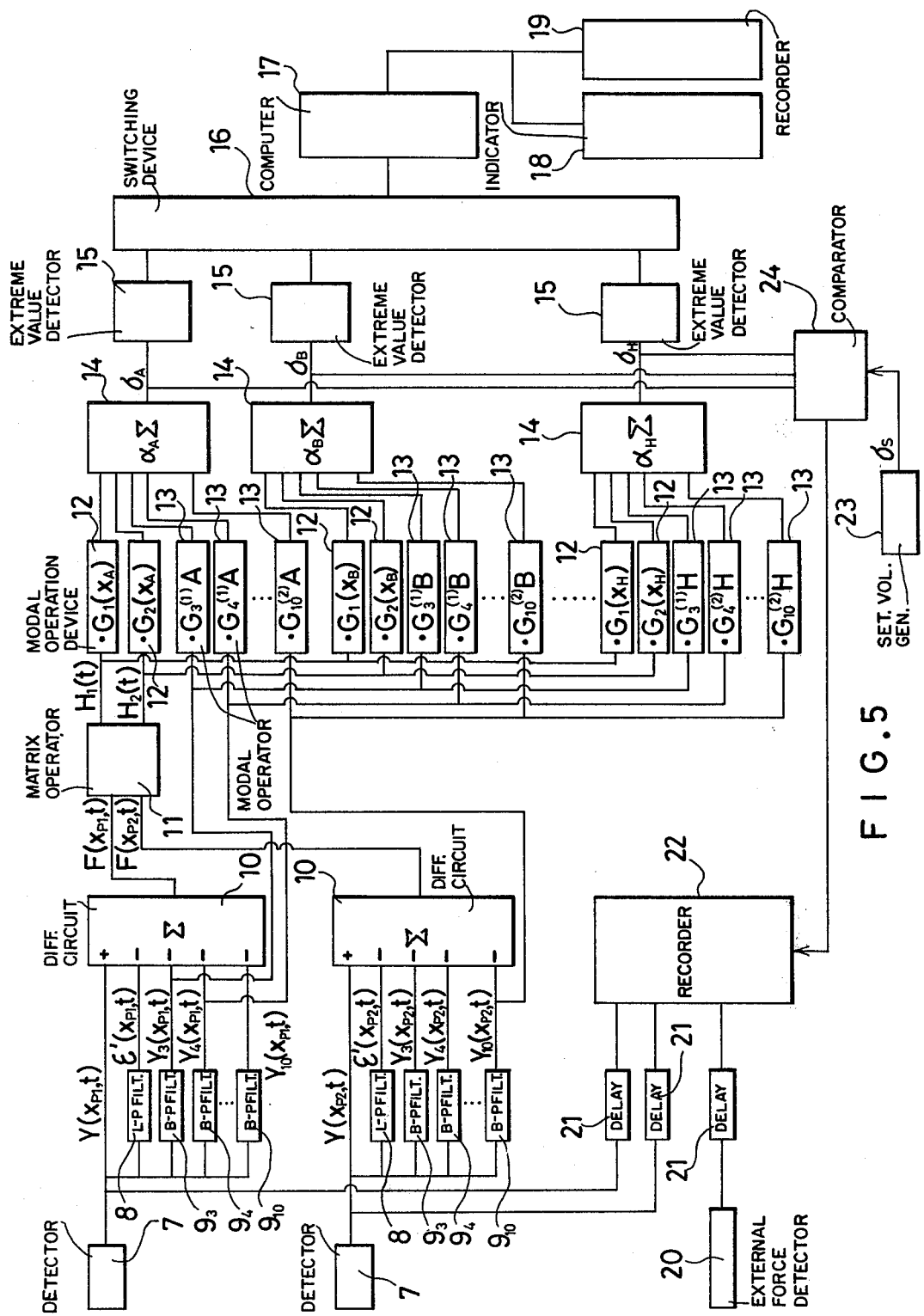
F I G. 5

TORSIONAL VIBRATION MONITORING APPARATUS FOR ROTATING SHAFT SYSTEM

BACKGROUND OF THE INVENTION

The present invention relates to a torsional vibration monitoring apparatus for monitoring torsional vibrations produced in a rotating shaft system for such as power generator turbine, in which the torsional vibrations are measured at a small number of selected positions of the rotating shaft system where the measurements are possible and the torsional vibrations at other arbitrary positions thereof are estimated by linearly separating the measured vibration, so that the rotating shaft system is monitored.

DESCRIPTION OF THE PRIOR ART

It has been commonly recognized that, in designing a rotating shaft system such as turbine generator, compressor or marine diesel engine, it is important to exactly know various disturbances affecting the rotating shaft system. Particularly, it is very important for operators of the system to know the fatigue life expenditure of the system which may vary with the disturbances. Since, however, the length of the rotating shaft system of, for example, the turbine generator is generally very long and may be several ten of meters in some cases, it is necessary to establish a number of measuring positions along the shaft system, causing a monitoring of the shaft system to be very difficult.

It is well known that torsional vibrations produced along the shaft system must be measured because it may determine fatigue and avoid damage to the shaft system. However, it is disadvantageous economically to install torsional vibration measuring devices at a large number of positions along the shaft system and it is sometimes impossible physically to do so.

In vibrography, the torsional vibration $Y(x,t)$ produced in the rotating shaft system can be represented by a sum of modal vibrations $Y_i(x,t)$ which, in turn, can be represented by a product of vibration mode types $G_i(x)$ and vibration mode components $H_i(t)$. That is, $$Y(x,t) = \Sigma Y_i(x,t) \quad (1)$$
$$= \Sigma G_i(x) \cdot H_i(t) \quad (2)$$

Furthermore, the vibration mode types $G_i(x)$ have waveforms determined by the rotating shaft system as shown in FIG. 1 and when $i \to \infty$, $\|G_i(x)\| = 0$ Therefore, the torsional vibration of the rotating shaft system is measured by a suitable torsional vibration detector disposed at a certain position P (coordinate being $x_p$) of the rotating shaft system, as $$Y(x_p,t) = \Sigma Y_i(x_p,t) = \Sigma G_i(x_p) \cdot H_i(t) \ldots \quad (3)$$

(see FIG. 2A), and then the detected torsional vibration is filtered by suitable filters, resulting in the modal vibration $$Y_i(x_p,t) = G_i(x_p) \cdot H_i(t) \ldots \quad (4)$$

as shown in FIG. 2B. The value of the vibration mode type $G_i(x_p)$ is determined primarily by the coordinate x as shown in FIG. 1.

Therefore, assuming the coordinate of an arbitrary position of the rotating shaft system, i.e., the point j at which the torsional vibration is to be monitored, as $x_j$, the modal vibration at the point j can be expressed as follows:

$$Y_i(x_j,t) = G_i(x_j) \cdot H_i(t) \quad (5)$$
$$= (G_i(x_j)/G_i(x_p)) \cdot G_i(x_p) \cdot H_i(t)$$
$$= (G_i(x_j)/G_i(x_p)) \cdot Y_i(x_p,t)$$
$$= G_{ij} \cdot Y_i(x_p,t)$$

(See FIG. 2C).

The above method which utilizes filters, however, may have as disadvantage of a response lag due to the transient response characteristics of the filters themselves. This is particularly important when the amplitude of the vibration varies abruptly. As a result, it is sometimes impossible to precisely estimate the vibrations at the monitoring point.

A method has been proposed to overcome the above disadvantage which uses the fact that $G_i(x)$ becomes equal to 0 when the number of i is large. That is, by setting the number of i in the equation (2) as a suitable number n, the equation (2) can be represented as follow:

$$Y(x,t) = \sum_{i=1}^{n} G_i(x) \cdot H_i(t) \quad (7)$$

Therefore, n sets of the torsional vibrations measured at certain n positions $p_k$ (coordinate being $x_{pk}$, k=1, 2, .. . n) of the rotating shaft system are represented as follow:

$$Y(x_{p1},t) = \sum_{i=1}^{n} G_i(x_{p1}) \cdot H_i(t)$$

$$\vdots$$

$$Y(x_{pn},t) = \sum_{i=1}^{n} G_i(x_{pn}) \cdot H_i(t)$$

As mentioned previously, $G_i(x_{pk})$ has constant values and, therefore, the above n sets of the equations are a simultaneous equation including n vibration mode components $H_i(t)$ as unknown term. Therefore, it is possible to previously obtain components $G'_{ik}$ of a reverse matrix representation (i and k being row and column, respectively) of a matrix representation (i and k being row and column, respectively) composed of n×n components $G_i(x_{pk})$. Accordingly the i-th vibration mode component can be represented by $$H_i(t) = \Sigma G'_{ik} \cdot Y(x_{pk},t) \ldots \quad (8)$$

from which the torsional vibration at the arbitrary position j can be estimated as below.

$$Y(x_j,t) = \sum_{i=1}^{n} G_i(x_j) \cdot H_i(t) \quad (9)$$
$$= \sum_{i=1}^{n} G_i(x_j) \cdot (\Sigma G'_{ik} \cdot Y(x_{pk},t))$$

In this method, however, the vibration must be detected at n points when the torsional vibration of the rotating shaft system is deemed as an accumulation of up to the i-th modal vibrations.

In general, when the torsion vibrations of the rotating shaft system are measured by using pickups, the places to install the pickups are limited and therefore the smaller the number of position at which the pickups are to be set the better. On the contrary, in estimating the vibration at the monitoring position, the number of modal vibration should be as large as possible to increase the estimation preciseness.

Furthermore, in this method, up to vibration mode components are obtained from the torsional vibrations including the n-th modal vibrations or more. Therefore, there is a problem that the vibration mode components themselves include noises.

SUMMARY OF THE INVENTION

The present invention is intended to overcome the disadvantages of the conventional monitoring method using the filters and the simultaneous equation, without affecting the advantages.

In order to achieve the above object, a torsional vibration monitoring apparatus measures torsional vibrations at arbitrary positions of the rotating shaft system This is done by detecting torsional vibrations at certain positions of the rotating shaft system on the basis of the fact that the torsional vibration produced in the rotating shaft system is an accumulation of modal vibrations thereof and that each modal vibration can be represented by a product of a vibration mode type and a vibration mode component. The present invention comprises n sets of detectors for detecting the torsional vibrations of the rotating shaft system at n certain positions thereof, decomposers for separating the respective torsional vibrations obtained by the detectors into respective (n+1) or more modal vibrations inherent to the rotating shaft system, subtractors for subtracting sums of the respective modal vibrations obtained by the decomposers from the modal vibrations obtained by the detectors, respectively, a matrix operator for multiplying the n vibrations composed of sums of the respective modal vibrations obtained by the subtractors with the previously obtained n sets of constants, each set including n constants, respectively and adding them, respectively, to obtain up to the n-th vibration mode components, first modal operation devices for dividing the (n+1) or more modal vibrations at arbitrary ones of the certain positions by the vibration mode types at the arbitrary ones, respectively and multiplying the vibration mode types at the arbitrary positions of the rotating shaft system to obtain respective (n+1) or more modal vibrations at the latter arbitrary positions, second modal operation devices for multiplying the up to n-th vibration mode components obtained by the matrix operator with the vibration mode types at the arbitrary position to obtain the n modal vibrations at the same positions and adders for adding the modal vibrations obtained by the first and second modal operation devices to obtain the torsional vibrations at the arbitrary positions.

Other objects and advantages of the present invention will be more clearly understood by reading the following description of the present invention with reference to the attached drawings.

BRIEF DESCRIPTION OF THE DRAWING

FIG. 2 shows various torsional vibration waveforms occurring in the rotating shaft system, in which FIG. 2A is a torsional vibration waveform at a certain position P of the rotating shaft system, FIG. 2B shows waveforms at the certain (i.e., selected) position P decomposed or separated into modal waveforms, FIG. 2C shows modal torsional vibration waveforms at arbitrary position j of the rotating shaft system computed from the various waveforms in FIG. 2B, FIG. 2D shows the torsional vibration waveform at the arbitrary position j which is obtained by combining the waveforms in FIG. 2C, and FIG. 2E is a stress waveform at the arbitrary position j, FIG. 5 is a block diagram of an embodiment of the present invention.

DESCRIPTION OF THE PREFERRED EMBODIMENT

Figure 1:
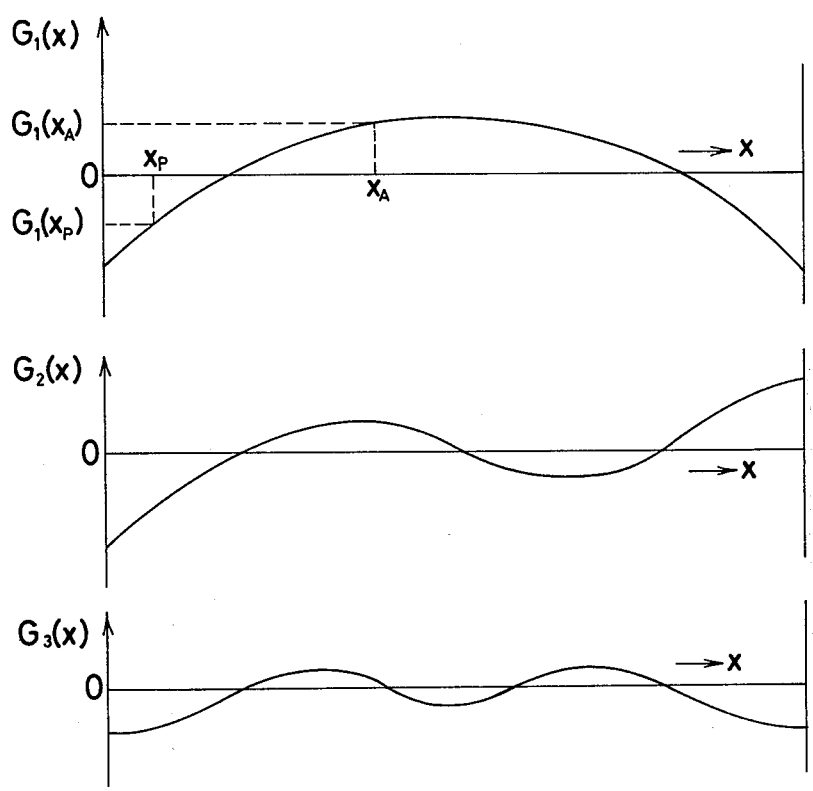
FIG. 1 is an explanatory illustration of torsional vibration modes of a rotating shaft system.

The torsional vibration measured at n certain positions PK(coordinate being $x_{pk}$) can be represented as follows:

$$Y(x_{pk},t) = \Sigma Y_i(x_{pk},t) \quad \ldots (10)$$

Therefore, defining $F(x_{pk},t)$ as being obtained by subtracting the (n+1)th to (n+m)th modal vibrations $$Y_i(x_{pk},t) \text{ (where } n < i \leq n+m\text{)}$$

obtained by using the filters from the torsional vibration shown by the equation (10), it can be represented as $$F(x_{pk},t) = Y(x_{pk},t) - \sum_{i=n+1}^{n+m} Y_i(x_{pk},t)$$
$$= \sum_{i=1}^{n} Y_i(x_{pk},t) + \epsilon(x,t)$$

In the above equation, the value $\epsilon(x,t)$ is a sum of the modal vibrations above the (n+m)th vibration. Deeming $\epsilon(x,t)$ is 0, the above equation can be written as follows:

$$F(x_{pk},t) = \sum_{i=1}^{n} Y_i(x_{pk},t) \quad (11)$$
$$= \sum_{i=1}^{n} G_i(x_{pk}) \cdot H_i(t)$$

The equation (11) is a simultaneous equation containing n equations each including n variables. Therefore, by previously obtaining a component $G'_{ik}$ of a reverse matrix of a matrix composed of n×n components $G_i(x_{pk})$, the following relation is obtained as for the equation (8)

$$H_i(t) = \sum_{i=1}^{n} G'_{ik} \cdot F(x_{pk},t) \quad (11')$$

The up to n-th modal vibrations at the arbitrary position j can be obtained from the equation (11'), which is as follow:

$$Y_i(x_j,t) = G_i(x_j) \cdot (\sum_{i=1}^{n} G'_{ik} \cdot F(x_{pk},t)) \quad (12)$$

One of m modal vibrations in each of the vibrations higher than (n+1) which are obtained from the filters is derived and represented by $Y_i(x_{pk},t)$. With $Y_i(x_{pk},t)$, the modal vibrations at the arbitrary position j which are higher than (n+1) can be represented by $$Y_i(x_j,t) = G_{ij}^{(k)} \cdot Y_i(x_{pk},t) \quad \ldots (13)$$

if a conversion coefficient $G_{ij}^{(k)}$ between the positions pk and j shown in the equation (5), where k is freely selectable and k=1, 2, . . . .

Therefore, the torsional vibration at the arbitrary position j can be estimated by adding the modal vibrations represented by the equations (12) and (13). That is, $$Y(x_j,t) = \sum_{i=1}^{n} [G_i(x_j) \cdot (\sum_{k=1}^{n} G'_{ik} \cdot F(x_{pk},t))] + \sum_{i=n+1}^{n+m} G_{ij}^{(k)} \cdot Y_i(x_{pk},t) \quad (14)$$

By processing the data in this manner, the lag in the transient response which is the disadvantage of the conventional filter method, the need of a number of measuring points which is the disadvantage of the simultaneous equation method and the error due to the high modal vibrations etc. are eliminated.

Figure 3:
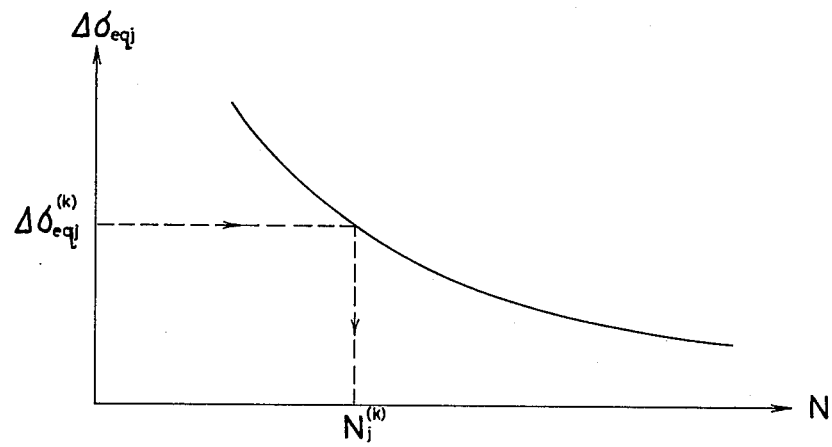
FIG. 3 is an S-N (stress amplitude—fatigue repetition number) diagram.

An embodiment of the present invention is described hereinafter with reference to FIGS. 3 to 5.

In this embodiment, the numbers n and m are selected as n=2 and m=8. Further, this embodiment includes a device for obtaining the fatigue life expenditure of the arbitrary position by using the estimated torsional vibrations at the arbitrary position and a monitoring device for use in a case of an abnormal vibration which may not be adequately estimated by the apparatus of the present invention. Firstly, it will be described how to obtain the fatigue expenditure life. The stress produced by the torsional vibration occurring in the rotating shaft system is proportional to the amplitude of the vibration. Therefore, putting a proportional constant at the point $x_j$ as $\alpha_j$, the stress $\sigma_j$ at the point $x_j$ can be represented by using the torsional vibration $Y(x_j,t)$ at the position $x_j$ obtained by the aforementioned apparatus as follow.

$$\sigma_j = \alpha_j \cdot Y(x_j,t) = \sum_i \alpha_j \cdot G_i(x_j) \cdot H_i(t) \quad (15)$$

(See FIG. 2E).

With the $\sigma_j$, it is possible to calculate the fatigue life at the position j by means of the known fatigue life expenditure method using the S-N (stress amplitude—fatigue repetition number) diagram of material. In this embodiment, it is performed by using the Range—pair counting method.

In the Range—pair counting method, it is assumed that the stress at the position j as shown in FIG. 2E is obtained according to the equation (15).

Putting the extreme values of the equation (15) as $\sigma_j^{(1)}$, $\sigma_j^{(2)}$—with an increase of time t, a difference $\Delta\sigma_j^{(k)}$ of the stress waveform amplitude between the k-th extreme value and the (k+1)th extreme value and a mean stress $\bar{\sigma}_j^{k}$ thereof are represented by $$\Delta\sigma_j^{(k)} = \tfrac{1}{2}|\sigma_j^{(k)} - \sigma_j^{(k+1)}| \quad \ldots (16)$$

$$\bar{\sigma}_j^{(k)} = \tfrac{1}{2}|\sigma_j^{(k)} + \sigma_j^{(k+1)}| \quad \ldots (17)$$

A stress difference $\Delta\bar{\sigma}_{eqj}^{(k)}$ equivalent to the case where the mean stress is zero can be represented according to the modified Goodman chart by $$\Delta\bar{\sigma}_{eqj}^{(k)} = \sigma_j^B \cdot \Delta\sigma_j^{(k)} / (\sigma_j^B - \bar{\sigma}_j^{(k)}) \ldots \quad (18)$$

where $\sigma_j^B$ is a tension strength of the rotating shaft at the arbitrary position j thereof.

Thus, by knowing the equivalent stress difference $\Delta\bar{\sigma}_{eqj}^{(k)}$ between those at the k-th and the (k+1)th extremes of the stress waveform at the arbitrary position j on the rotating shaft system, the number $N_j^{(k)}$ *of the repetitive applications of the equivalent stress difference* $\Delta\bar{\sigma}_{eqj}^{(k)}$ to the arbitrary position j prior to a breakdown of the shaft can be known from the S-N diagram. This shows the relation between the stress difference of the shaft material at the arbitrary position j and the repetitive number of the stress applications.

Therefore, by assuming that the variation of the stress is a half of a cycle of the stress wave, an expenditure $\Delta D_j^{(k)}$ of the shaft life due to the shift from the extreme value $\sigma_j^{(k)}$ to $\sigma_j^{(k+1)}$ is represented by $$\Delta D_j^{(k)} = 1/(2 \cdot N_j^{(k)}) \quad \ldots (19)$$

Accordingly, the variation of the stress at the arbitrary position j of the rotating shaft system is computed according to the equation (15), the extreme values are counted and the expenditure $\Delta D_j^{(k)}$ of the life is computed and accumulated according to the equations (16) to (19). That is, the resultant accumulation $D_j$ can be represented by $$D_j = \sum_{k}^{n} \Delta D_j^{(k)} = \sum_{k}^{n} 1/(2N_j^{(k)}) \quad (20)$$

Figure 4:
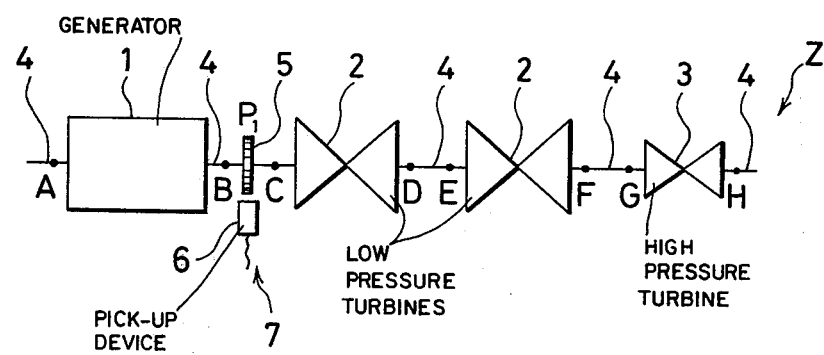
FIG. 4 is a schematic illustration of the present apparatus when applied to a turbine generator.

The apparatus in FIG. 4, includes a generator 1, low pressure turbines 2 and a high pressure turbine 3 for driving the generator 1, respectively. A number of rotating shafts 4 connect each low pressure turbine 2 to the high pressure turbine 3 and to the generator. The rotating shafts 4 are arranged in series to constitute a rotating shaft system Z. A turning gear 5 is disposed at one position $P_1$ (coordinate being $x_{p1}$) of two certain positions PK of the shaft 4. A pickup device 6 serves for detecting torsional vibration of the rotating shaft 4. The pickup 6, together with the turning gear 5, forms a detector 7 for transient torsional vibration of shaft.

Of course, the certain position $P_1$ may be set at any position on the rotating shaft system.

Positions A to H on the rotating shaft system (4) are arbitrary positions at which the torsional vibrations are to be monitored and coordinates thereof are represented by $x_A$ to $x_H$ which are generalized as $x_j$. Therefore, the value of the $x_j$ can be arbitrarily selected. That is, the monitoring position can be freely set.

In FIG. 5, lowpass filters 8 have characteristics for passing frequency components lower than about 1–2 $H_z$ to separate the rigid mode vibration $\epsilon'(x_{pk},t)$ which is common throughout the shaft system Z.

Separators $9_3$ to $9_{10}$ (generalized as $9_i$) are each composed of a bandpass filter to separate i th mode modal vibration $Y_i(x_{pk},t)$ Each of a number of substractors 10 functions to substract the outputs $\epsilon'(x_{pk},t)$ and $Y_i(x_{pk},t)$ of the lowpass filter 8 and the decomposers $9_i$ from the torsional vibration $Y(x_p,t)$ detected by the detector 7 to obtain $F(x_{pk},t)$ shown by the equation (11). A matrix operator 11 functions to multiply $F(x_{p1},t)$ and $F(x_{p2},t)$ obtained by the subtractors 10 with values $(G'_{11}, G'_{12})$, ($G'_{21}$, $G'_{22}$) of a reverse matrix components of 2×2 and add the results to obtain the first and second vibration mode component $H_1(t)$ and $H_2(t)$ represented by the equation (11). A number of second modal operation devices 12 serve for obtaining the first and second modal vibrations $Y_i(x_j,t)$ (See the equation (12)) at the arbitrary position $x_j$ by multiplying the vibration mode components ($H_i(t)$) with the same order vibration mode types $G_i(x_j)$ at the arbitrary position $x_j$. First modal operators. The first modal operators 13 function to divide the third and fourth modal vibrations at the certain position $x_{p1}$ and the fifth and tenth modal vibrations $Y_i(x_{pk},t)$ at the certain position $x_{p2}$ by the i-th vibration mode type $G_i(x_{pk})$ at the position $x_{pk}$ and to multiply the result of the division with the i-th vibration mode type $G_i(x_j)$ at the arbitrary position. That is, the first modal operators 13 function to obtain the modal vibrations $Y_i(x_j,t)$ at the position j shown by the equation (13) by multiplying the conversion coefficient $G_{ij}^{(k)}$.

A number of adders 14 add the modal vibrations $Y_i(x_j,t)$ at the arbitrary position $x_j$ (j=A...H) obtained by the first and second modal operators 13, 12 to obtain the torsional vibration $Y(x_j,t)$ at the arbitrary position $x_j$ as shown by the equation (14). It should be noted that in this embodiment the stress $\sigma_j$ is obtained by multiplying the proportional constant $\alpha_j$ according to the equation (15). Extreme value detectors 15 detect extremes $\sigma_j^{(k)}$ (k=1, 2, ...) of the stress $\sigma_j$. The outputs of the extreme value detectors 15 are fed to a computer 17 which computes the fatigue life expenditure shown by the equations (16) to (20). A switching device 16 combines the data from the detectors 15 and transmitting the combined data. An indicator 18 indicates the fatigue life expenditures at the respective point of the rotating shaft system as computed by the computer 17 and a recorder 19 serves for recording the expenditures, respectively. By recognizing that the expenditure life $D_j$ at the position j becomes 1, and by using the indicator 18 and the recorder 19, it is possible to know when the life at the position j ends. An external force detector 20 serves for detecting an external force applied to the rotating shaft system Z due to an overload such as caused by thunder and a delay circuit 21 compensates for a time interval from the starting of the recorder 22 to a time at which the rotation of the shaft system becomes regular and the normal recording become possible A set voltage generator 23 generates a voltage corresponding to the stress set value $\sigma_s$ and a comparator 24 compares the stress $\sigma_j$ at the arbitrary position which is obtained by the multiplier 14 with the set value $\sigma_s$ to start the recorder 22 when $\sigma_s < \sigma_j$. The recorder 22 functions to record the outputs of the external force detector 20 and the detectors 7. Therefore, the torsional vibration $Y(x_{pk},t)$ at the fixed position PK when the stress at the position j is too large and the external force exerted on the shaft system at that time are recorded by the recorder 22.

In this manner, the embodiment of the present invention is such that the torsional vibrations produced in the rotating shaft 4 are detected by the detectors 7 disposed at two certain (selected) positions P to calculate the torsional vibrations at the arbitrary positions j. Further, the fatigue expenditure life at the arbitrary positions is calculated by obtaining the stress.

That is, in the present invention, the monitoring of the arbitrary positions is performed by not using pickups at every monitoring positions of the rotating shaft system but using pickups disposed at only a limited number of the fixed positions to estimate the stress at the arbitrary positions. Therefore, there is no physical limitation on the monitoring points.

Since a real vibration at the point P and the external force exerted on the shaft system, when a stress exceeding the set value is produced, i.e., the vibration is not suitable to linearly decompose for the estimation, are recorded by the external force detector 20, the comparator 24 and the recorder 22, the recorded data can be fully analysed later by a large computer. Further since there is no need of recording full data for a long period of time, it is economical.

What is claimed is:

1. In a torsional vibration monitoring apparatus in which torsional vibrations at arbitrary positions of a rotating shaft system are measured by torsional vibrations detected at certain positions of the rotating shaft system on the basis of the fact that the torsional vibration produced in the rotating shaft system is an accumulation of modal vibrations thereof and that each modal vibration can be represented by a product of a vibration mode type and a vibration mode component, the improvement comprising n sets of detectors for detecting the torsional vibrations of the rotating shaft system at n certain positions thereof, decomposers for separating the respective torsional vibrations obtained by said detectors into respective (n+1)th or higher modal vibrations inherent to the rotating shaft system, subtractors for subtracting sums of the respective modal vibrations obtained by said decomposers from the modal vibrations obtained by said detectors, respectively, a matrix operator for multiplying the n vibrations having sums of the respective modal vibrations obtained by said subtractors with the previously obtained n sets of constants, each set including n constants, respectively, and adding them, respectively, to obtain up to the n-th vibration mode components, first modal operation devices for dividing the (n+1)th or higher modal vibrations at arbitrary ones of the certain positions by the vibration mode types at the arbitrary positions, respectively, and multiplying the vibration mode types at the arbitrary positions of the rotating shaft system to obtain respective (n+1)th or higher modal vibrations at the arbitrary positions, second modal operation devices for multiplying the up to the n-th vibration mode components obtained by said matrix operator with the vibration mode types at the arbitrary positions to obtain the up to n-th modal vibrations at the same positions and adders for adding the modal vibrations obtained by said first and second modal operation devices to obtain the torsional vibrations at the arbitrary positions.

2. A torsional vibration monitoring apparatus as claimed in claim 1, further comprising a fatigue expenditure life calculating device including extreme value detectors for detecting extreme values of stresses at the arbitrary positions by using the modal vibrations at the arbitrary positions, the modal vibrations being obtained by said adders, a switching device for combining data from said extreme value detectors and a computer responsive to data supplied from said switching device for computing the fatigue expenditure life at the arbitrary positions.

* * * * *